United States Patent
Ogawa

(10) Patent No.: US 11,488,408 B2
(45) Date of Patent: Nov. 1, 2022

(54) PREDICTION DEVICE, PREDICTION METHOD, PREDICTION PROGRAM

(71) Applicant: Green Monster Co., Ltd., Tokyo (JP)

(72) Inventor: Akira Ogawa, Tokyo (JP)

(73) Assignee: Green Monster Co., Ltd., Tokyo (JP)

(*) Notice: Subject to any disclaimer, the term of this patent is extended or adjusted under 35 U.S.C. 154(b) by 0 days.

(21) Appl. No.: 17/449,709

(22) Filed: Oct. 1, 2021

(65) Prior Publication Data

US 2022/0261575 A1 Aug. 18, 2022

(30) Foreign Application Priority Data

Feb. 18, 2021 (JP) ................ JP2021-024004

(51) Int. Cl.
*G06V 30/413* (2022.01)
*G06Q 40/04* (2012.01)
*G06Q 30/02* (2012.01)

(52) U.S. Cl.
CPC ....... *G06V 30/413* (2022.01); *G06Q 30/0206* (2013.01); *G06Q 40/04* (2013.01)

(58) Field of Classification Search
CPC .. G06V 30/413; G06Q 30/0206; G06Q 40/04; G06Q 10/04; G06Q 30/0202; G06Q 40/06; G06Q 40/00
See application file for complete search history.

(56) References Cited

U.S. PATENT DOCUMENTS

2022/0027933 A1* 1/2022 Schneider .......... G06Q 30/0206

FOREIGN PATENT DOCUMENTS

| CN | 106960019 A | * | 7/2017 | |
| CN | 112132356 A | * | 12/2020 | |
| JP | 2017-117152 | | 6/2017 | |
| JP | 2020-047219 | | 3/2020 | |
| JP | 6812034 B | | 1/2021 | |
| WO | WO-2020075304 A1 | * | 4/2020 | ............. G06Q 40/04 |

OTHER PUBLICATIONS

Farnham, Kezia. "ESG Scores and Ratings: What They Are, Why They Matter." Diligent. Aug. 17, 2020. (Year: 2020).*
Zhou, Qiao and Ningning Liu. "A Stock Prediction Model Based on DCNN" School of Information Technology and Management, University of International Business and Economics. Sep. 7, 2020. (Year: 2020).*

(Continued)

Primary Examiner — Elda G Milef
(74) Attorney, Agent, or Firm — Hamre, Schumann, Mueller & Larson, P.C.

(57) ABSTRACT

There is provided a prediction device that analyzes a chart image indicating price fluctuations of a financial instrument and predicts a future price of the financial instrument, the prediction device including an image acquiring unit that acquires a prediction target image to be a prediction target of the future price, an outputting unit that inputs the prediction target image to a learned model and outputs type data serving as a type of a chart included in the prediction target image from the learned model, and a predicting unit that outputs a predicted value of the future price based on a price after a lapse of a predetermined period from the type data.

5 Claims, 8 Drawing Sheets

(56) References Cited

OTHER PUBLICATIONS

Optimisation by CNN in the table of Kawai,, 4 hours, 15 minutes (SIG-FIN) 019 [online], The Japanese Society for Artificial Intelligence, Oct. 11, 2017, p. 1-6—Abstract.

In response to the potential of a law student, the plaintiff holds an impressive AI price prediction result [Fintech Data Championship] and a seminar for a student for a Awards Ceremony student. On Apr. 22, 2016, LabBase,2019 : URL,https://compass.labbase.jp/articles/362—See p. 2 of the English Translation of the Japanese Office Action issued Apr. 20, 2021 for a concise explanation.

A statement of the stock index by a person ordinarily skilled in the art, a "folding Neural Network", a research report, Research Report of Doshisha University, Doshisha University, Jul. 31, 2018, p. 43-50, URL,http://doi.org/10.14988/pa.2018.0000000163—Abstract.

Office Action issued in corresponding Japanese Patent Application No. 2021-024004, dated Apr. 20, 2021, 10 pages w/translation.

\* cited by examiner

FIG. 3A

| INSTRUMENT TYPES | ELEMENT LABELS ||||| TEACHER DATA ID INFORMATION | FEATURE AMOUNTS | DATA NAMES |
|---|---|---|---|---|---|---|---|---|
| | TREND ELEMENTS | ISSUES | PERIODS | FUTURE PRICES | | | | |
| STOCK | DOUBLE TOP | COMPANY A | ONE DAY | UP | I001 | — | xxx.jpg |
| STOCK | DOUBLE TOP | COMPANY A | ONE DAY | DOWN | I002 | — | yyy.jpg |
| STOCK | DOUBLE TOP | COMPANY A | FIVE MINUTES | RANGE TRADING | I003 | — | zzz.csv |

FIG. 3B

| INSTRUMENT TYPES | ELEMENT LABELS ||||| TEACHER DATA ID INFORMATION | FEATURE AMOUNTS | DATA NAMES |
|---|---|---|---|---|---|---|---|---|
| | TREND ELEMENTS | CURRENCY PAIRS | PERIODS | FUTURE PRICES | | | | |
| CURRENCY | DOUBLE TOP | JAPANESE YEN – U.S. DOLLAR | ONE DAY | UP | I004 | — | xxx.jpg |
| CURRENCY | DOUBLE TOP | JAPANESE YEN – U.S. DOLLAR | ONE DAY | DOWN | I005 | — | yyy.jpg |
| CURRENCY | DOUBLE TOP | JAPANESE YEN – U.S. DOLLAR | FIVE MINUTES | RANGE TRADING | I006 | — | zzz.csv |

FIG. 5A

| PREDICTION TARGET IMAGE ID INFORMATION | FILE NAMES | INSTRUMENT TYPES | TEACHER DATA ID INFORMATION | PREDICTED VALUES |
|---|---|---|---|---|
| P001 | xxx.jpg | STOCK | I001 | UP |
| P002 | yyy.jpg | STOCK | I002 | DOWN |
| P003 | zzz.jpg | STOCK | I003 | RANGE TRADING |

FIG. 5B

| PREDICTION TARGET IMAGE ID INFORMATION | FILE NAMES | INSTRUMENT TYPES | TEACHER DATA ID INFORMATION | PREDICTED VALUES |
|---|---|---|---|---|
| P004 | xxx.jpg | CURRENCY | I004 | UP |
| P005 | yyy.jpg | CURRENCY | I005 | DOWN |
| P006 | zzz.jpg | CURRENCY | I006 | RANGE TRADING |

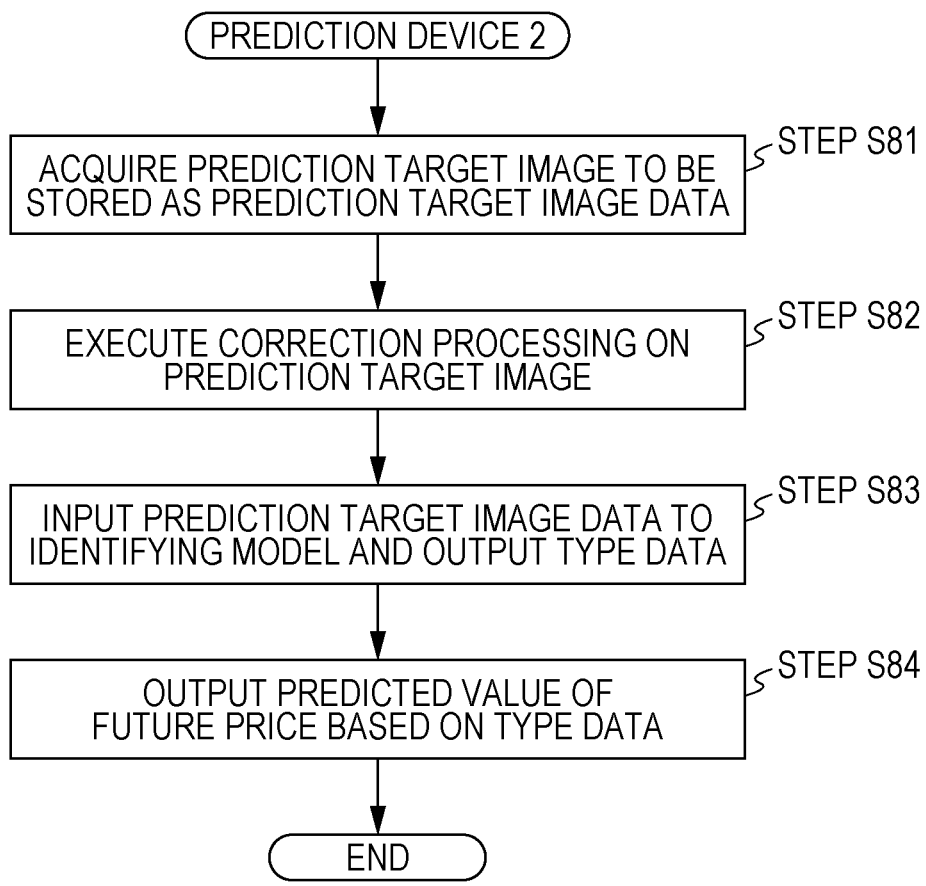

PREDICTION DEVICE, PREDICTION METHOD, PREDICTION PROGRAM

BACKGROUND

Technical Field

The present invention relates to a prediction device, a prediction method, a prediction program that analyze a chart image illustrating price fluctuations of a financial instrument and predict a future price of the financial instrument.

Related Art

In recent years, a technique for predicting future prices of financial instruments such as stocks and currencies by using artificial intelligence (AI) is known.

JP 6812034 B1 discloses an exchange transaction information display program for displaying information regarding fluctuations in exchange rates. The exchange transaction information display program uses an image of a chart pattern of a trade signal as teacher data, uses an input as a chart of each exchange rate, uses an output as a type of a trade signal, and performs fitting based on a determination model generated by machine learning to display fluctuation data of each exchange rate.

JP 2017-117152 A discloses a transaction management system that performs machine learning using past stock price information. It is understood that a purpose of the system in JP 2017-117152 A is to efficiently and accurately predict a stock price by using machine learning and to support improvement in execution performance of an algorithm trade tactic.

SUMMARY

In the techniques disclosed in the prior art documents as described above, in order to acquire information regarding fluctuations in exchange rates and stock prices, it is necessary to input much data obtained by cooperating with a plurality of systems. In addition, chart data includes data regarding prices as time-series data, and if all of the data is to be input to a machine learning model, a large load is applied to hardware resources, which is a problem.

The present invention has been made in view of the above circumstances, and an object of the present invention is to provide a prediction device, a prediction method, a prediction program that analyze a chart image indicating price fluctuations of a financial instrument and predict a future price of the financial instrument.

In order to solve the problem described above, the present invention is a prediction device that analyzes a chart image indicating price fluctuations of a financial instrument and predicts a future price of the financial instrument, and the prediction device includes an image acquiring unit that acquires a prediction target image to be a prediction target of the future price, an outputting unit that inputs the prediction target image to a learned model and outputs, from the learned model, type data serving as a type of a chart included in the prediction target image, and a predicting unit that outputs a predicted value of the future price based on a price after a lapse of a predetermined period from the type data.

With such a configuration, a predicted value of a future price of a financial instrument can be easily and accurately obtained by inputting a chart image. In addition, since an analysis result based on a chart image is obtained, it is possible to provide an interface effective for a user to develop investment skills on which feature part of a chart image should be focused to predict a future price of a financial instrument.

In a preferred mode of the present invention, there is provided an image processing unit that identifies a trend element indicating a trend of price fluctuations in a prediction target image, and executes correction processing on the prediction target image based on the identified trend element.

With such a configuration, type data can be identified with high accuracy.

In a preferred mode of the present invention, a trend element includes extreme values of the price fluctuations, and the correction processing includes processing of providing a straight line including at least two or more of the extreme values.

With such a configuration, image processing can be performed based on a particularly important trend element.

In a preferred mode of the present invention, the image processing unit identifies a non-trend element in which price fluctuations in the prediction target image are equal to or less than predetermined values, and executes correction processing on the prediction target image based on the identified non-trend element.

With such a configuration, the correction processing of a non-trend element can reduce a burden of hardware resources related to subsequent image processing.

In a preferred mode of the present invention, a prediction target image is a chart image including a time axis.

With such a configuration, a time axis can be easily input by image recognition.

In a preferred mode of the present invention, a prediction target image is a chart image including information indicating a stock name or a currency pair.

With such a configuration, information necessary for prediction, such as stock names and exchange rates, can be easily input by image recognition.

In a preferred mode of the present invention, type data is a past type chart image, and the learned model is machine-learned by a data set including the type chart image and a price after a lapse of a predetermined period from the type chart image.

With such a configuration, machine learning is performed based on type data of a chart image, and prediction accuracy can be improved.

In a preferred mode of the present invention, a data set includes a past type chart image subjected to processing similar to the correction processing.

With such a configuration, it is possible to generate a learned model capable of accurately identifying a trend element of a prediction target image.

In a preferred mode of the present invention, the outputting unit determines a learned model machine-learned using a type chart image of a different stock name in a common industry sector as a data set, as a learned model to which a prediction target image is input.

With such a configuration, even when a type degree of type data is low, it is possible to output type data with a higher type degree by using a different learned model.

In a preferred mode of the present invention, the data set in which a type of financial instrument is stock includes the number of transmissions of one or more pieces of information selected from information on financial results, business forecasts, press releases, intellectual property applications, and ESG scores transmitted by a company that issues the stock in a predetermined period.

With such a configuration, it is possible to analyze information contributing to price fluctuations of a financial instrument and generate a machine-learned model capable of analyzing a trend of price fluctuations with higher accuracy.

The present invention is a prediction method for analyzing a chart image indicating price fluctuations of a financial instrument and predicting a future price of the financial instrument, and the prediction method executed by a computer includes an image acquiring step of acquiring a prediction target image to be a prediction target of the future price, an outputting step of inputting the prediction target image to a learned model and outputting, from the learned model, type data serving as a type of a chart included in the prediction target image, and a predicting step of outputting a predicted value of the future price based on a price after a lapse of a predetermined period from the type data.

The present invention is a prediction program that analyzes a chart image indicating price fluctuations of a financial instrument and predicts a future price of the financial instrument, and the prediction program causes a computer to function as an image acquiring unit that acquires a prediction target image to be a prediction target of the future price, an outputting unit that inputs the prediction target image to a learned model and outputs, from the learned model, type data serving as a type of a chart included in the prediction target image, and a predicting unit that outputs a predicted value of the future price based on a price after a lapse of a predetermined period.

The present invention is a learning device that analyzes a chart image indicating price fluctuations of a financial instrument and generates a machine-learned model for predicting a future price of the financial instrument, the learning device including a learning unit that generates a machine-learned model by a data set including a past type chart image and a price after a lapse of a predetermined period from the type chart image, wherein the learned model receives an input of a prediction target image to be a prediction target of the future price and outputs the past type chart image serving as a type of a chart included in the prediction target image.

According to the present invention, it is possible to provide a prediction device, a prediction method, a prediction program that analyze a chart image indicating price fluctuations of a financial instrument and predict a future price of the financial instrument.

BRIEF DESCRIPTION OF DRAWINGS

FIGS. 3A and 3B illustrate examples of data structures of teacher data according to the embodiment of the present invention;

FIGS. 5A and 5B illustrate examples of data structures of a prediction result according to the embodiment of the present invention;

FIG. 8 illustrates a flowchart of prediction processing according to the embodiment of the present invention.

DETAILED DESCRIPTION

Hereinafter, a prediction system according to an embodiment of the present invention will be described with reference to the drawings. Note that the following embodiments are examples of the present invention, and the present invention is not limited to the following embodiments, and various configurations can be adopted.

In the present embodiment, configurations, operations, and the like of a prediction system, a prediction device, and a prediction program will be described. However, methods with similar configurations, computer programs, program recording media that record the programs, and the like, also have similar function effects. By using a program recording medium, for example, the program can be installed in a computer. A series of processing according to the present embodiment described below is provided as a computer-executable program, and can be provided via a non-transitory computer-readable recording medium such as a CD-ROM or a flexible disk, and further via a communication line.

Respective units of the prediction system and the prediction device and respective steps of a prediction method achieve similar function effects. Each unit in the prediction system, the prediction program, and the prediction program recording medium is realized by an arithmetic device such as a CPU. In addition, each step of the prediction method is similarly realized by the arithmetic device.

The present invention is used for predicting a future price of a financial instrument of which a price fluctuates in a transaction market.

In the present invention, financial instruments of which the future prices are to be predicted include stocks, securities, currencies, real estate, and the like, and are not limited by types thereof.

In addition, the present invention is not limited to a prediction device, a prediction method, a prediction program, and a learning device of a future price of a financial instrument to be transacted in an actual transaction market, and may be used for prediction of future prices of various virtual financial instruments to be transacted in a transaction simulation system, for example.

Figure 1:
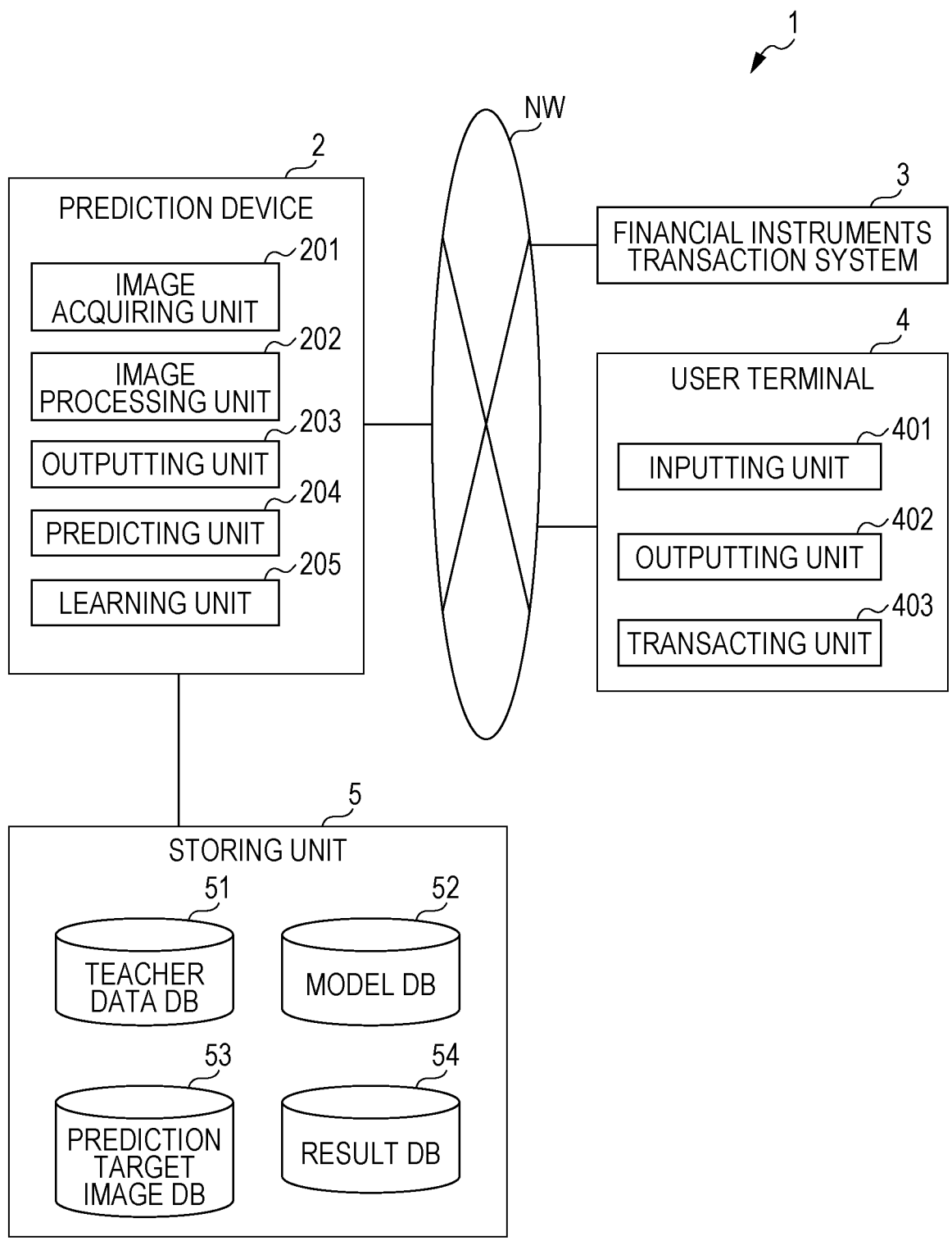
FIG. 1 is a functional block diagram of a prediction system according to an embodiment of the present invention.

FIG. 1 illustrates a functional block diagram of the prediction system. In FIG. 1, the prediction system is embodied as a prediction system 1. The prediction system 1 includes a prediction device 2 that predicts, based on a chart image indicating price fluctuations of a financial instrument, a future price of the financial instrument, a financial instruments transaction system 3 that executes processing related to transaction processing of a financial instrument and has data related to the price of the financial instrument, and a user terminal 4 that is operated by a user who executes a transaction of a financial instrument and executes a transaction of a financial instrument via the financial instruments transaction system 3. Each configuration of the prediction system 1 is communicable via a communication network NW. The communication network NW includes an Internet Protocol (IP) network such as the Internet, a dedicated line, and the like. In the following description, an intervention of the communication network NW will be omitted unless it is unclear.

The financial instruments transaction system 3 has and provides financial instrument data related to a price of a financial instrument. The financial instruments transaction system 3 is, for example, a system of a securities company or a stock exchange having data regarding stock prices, or a system of a financial institution such as a bank having data regarding exchange rates.

The prediction device 2 acquires financial instrument data from the financial instruments transaction system 3. The prediction device 2 generates a chart indicating price fluctuations of financial instruments based on the financial instrument data. Note that the prediction device 2 may acquire a chart generated in the financial instruments transaction system 3.

The prediction device 2 includes a storing unit 5 that stores various data internally or externally, and is communicable. The storing unit 5 includes a teacher data database (DB) 51 that stores teacher data, a model database (DB) 52 that stores a learned model machine-learned by the teacher data, a prediction target image database (DB) 53 that stores a chart image serving as a target for predicting a future price of a financial instrument, and a result database (DB) 54 that stores a prediction result of a prediction target image.

The prediction device 2 includes, as functional components to be described in detail later, an image acquiring unit 201 that acquires a prediction target image, an image processing unit 202 that executes image processing on the prediction target image, an outputting unit 203 that inputs the prediction target image to a learned model and outputs, from the learned model, type data serving as a type of a chart included in the prediction target image, a predicting unit 204 that outputs a predicted value of a future price based on a price of a financial instrument after a lapse of a predetermined period from the type data, and a learning unit 205 that generates a learned model by machine learning using teacher data.

The user terminal 4 is a terminal device operated by a user who predicts a price of a financial instrument and executes a transaction of the financial instrument. The user terminal 4 is a terminal device having a communication function, and can use a general computer device including, as hardware components, an arithmetic device (CPU), a main storage device (RAM), an auxiliary storage device such as an HDD, an SSD, and a flash memory, a communication device for communicating with an external device, an input device such as a keyboard, a mouse, and a touch panel, an output device such as a display and a speaker, and a bus connecting each component. As a computer device, a smartphone, a tablet terminal, a personal computer (PC), or the like can be used. The user terminal 4 stores an application program in the auxiliary storage device, and functions as each unit by the program executed by the CPU.

The user terminal 4 includes, as functional components, an inputting unit 401 that receives various data inputs, an outputting unit 402 that outputs various data and instruction information, and a transacting unit 403 for executing transaction processing related to a transaction of a financial instrument. In the present embodiment, the user terminal 4 can transmit a prediction target image to the prediction device 2 and receive a prediction result based on the prediction target image from the prediction device 2.

Figure 2:
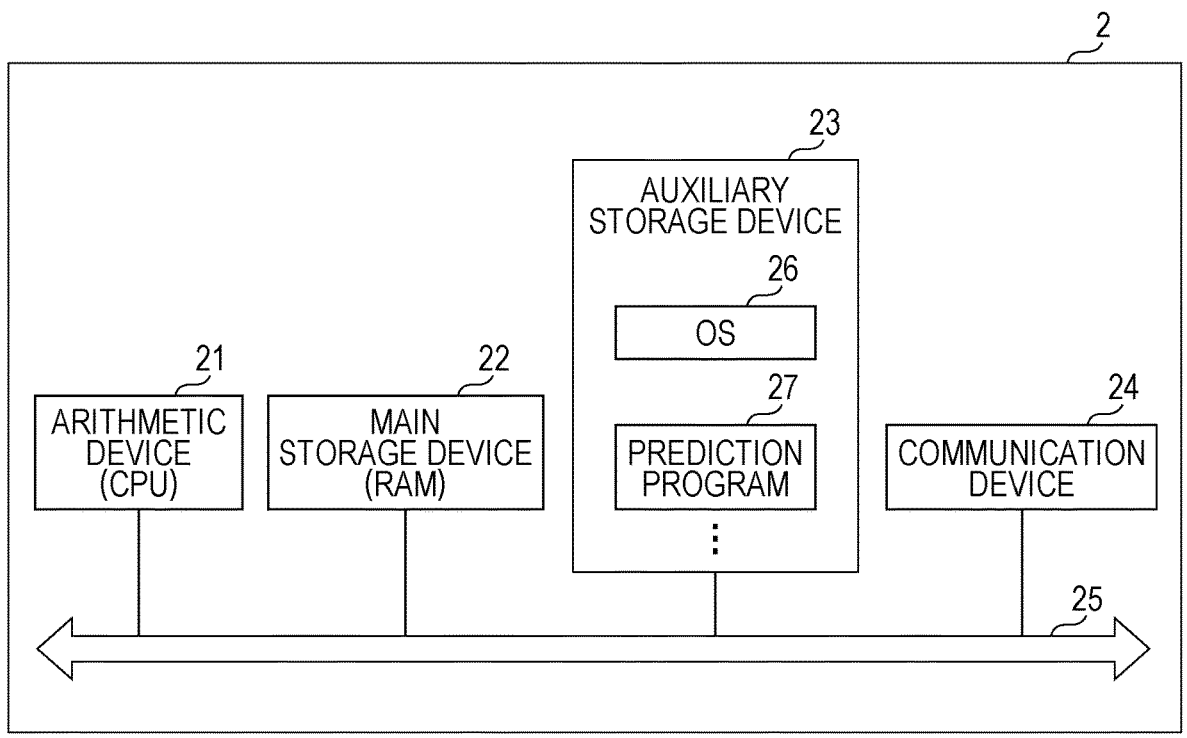
FIG. 2 illustrates a hardware configuration diagram of a prediction device according to the embodiment of the present invention.

FIG. 2 is a hardware configuration diagram of the prediction device 2. The prediction device 2 includes, as hardware components, an arithmetic device (CPU) 21, a main storage device (RAM) 22 as a working memory, an auxiliary storage device 23 such as an HDD, an SSD, and a flash memory, a communication device 24 for communicating with an external device, a bus 25 for connecting each component, and the like. In addition, the auxiliary storage device 23 stores an operating system (OS) 26, a prediction program 27 that exerts its function in cooperation with the OS 26, various types of information (including data), and the like. The prediction device 2 realizes the functional components (201 to 205) described above by the prediction program 27 executed by the CPU 21.

Data stored in the storing unit 5 according to the present embodiment will be described.

FIGS. 3A and 3B illustrate examples of data structures of teacher data stored in the teacher data DB 51. The teacher data DB 51 stores different teacher data according to an instrument type of a financial instrument. FIG. 3A illustrates a data structure in which the instrument type is stock, and FIG. 3B illustrates a data structure in which the instrument type is currency, each as an example. The learning unit 205 executes machine learning processing with each teacher data to generate a learned model.

The data structure (data set) of the teacher data includes, with a label assigned to data as a key, teacher data ID information for uniquely identifying teacher data, a feature amount included in a chart image, a data name, and the like. In the present embodiment, a data type of the teacher data is preferably image data indicating a chart of a financial instrument, but may be a file in which a time series and a price indicating a chart are stored in a CSV format or the like. The prediction device 2 can execute conversion processing of converting a CSV format chart into a chart image.

The feature amount is stored as a data group of luminance, color, pixel array, and the like for each pixel acquired from the image data by image recognition processing. The learning unit 205 can execute image recognition processing known as a conventional technique. The learning unit 205 automatically acquires the feature amount included in the image data by, for example, a machine learning method through deep learning, but the machine learning method is not limited thereto, and any machine learning model or the like may be adopted. The deep learning does not require a user to set a feature amount, and a computer can automatically extract a feature amount of an object included in the image data and classify and identify the object.

In the present embodiment, the feature amount includes features of a shape in a chart. The features of a shape include chart shapes of interest in technical analysis, such as upward trends, downward trends, extreme values (top/bottom), double top/double bottom, and V-shape.

In the present embodiment, the label has a plurality of element labels according to the instrument type. The element label in which the instrument type is stock includes trend elements, issues, periods, future prices, and the like of a chart. The trend elements are elements related to a chart shape indicating a trend of price fluctuations used in technical analysis, and include extreme values (top/bottom), double top/double bottom, V-shape, box, pennant, wedge, triangle, and the like. The issues indicate security names or security codes. The periods are data collection periods, and include minutes, hours, days, weeks, months, years, and the like. In addition, minutes may be in units of minutes such as one minute, three minutes, and five minutes, and an arbitrary unit may also be set in hours, days, and the like. The future prices are set based on prices of financial instruments after a lapse of a predetermined period from chart images serving as teacher data. A price in the latest time series in a chart image is set as a current price, and for example, when the data collection period is five minutes, the future price is set based on a price five minutes after the current price. The future price includes whether the future price rises or falls from the current price, and may include a rising value or a falling value. When the rising value or the falling value is equal to or less than a predetermined value, the future price may be set as "range trading" in which the prices are balanced.

In addition, the teacher data in which the instrument type is stock can include, for more detailed analysis, one or more pieces of information selected from information on financial results, business forecasts, press releases, intellectual properties, and ESG scores transmitted by a stock issuing company, as element labels. The information on financial results is information including a fiscal term, profit and loss data, assets, liabilities, and the like. The information on business forecasts is information including estimates of sales, operating profits, current profits, net profits, and the like, for the next fiscal term. The information on press releases includes information related to notice or announcement of new products, commodities, or the like. The information on intellectual properties is information indicating the number of applications, the number of acquisitions, related budget, and the like of intellectual property rights. The information on ESG scores is information indicating an ESG score, the number of information disclosures related to ESG score calculation, and the like. These are investor relations (IR)-related information related to IR activities of stock-issuing companies, and affect stock transaction behaviors of users. Note that the teacher data may be set, as the element label, the number of transmissions indicating the number of times that a stock-issuing company has transmitted at least one or more pieces of information selected from the above-described IR-related information within a predetermined period.

The element label in which the instrument type is currency includes trend elements, currency pairs, periods, future prices, and the like. A currency pair indicates a pair of currencies between countries, for example, Japanese yen—U.S. dollar, Japanese yen—Chinese yuan, and the like. Since the other element labels in currency are similar to those in stock, the description thereof will be omitted.

In the label of the teacher data, it is not necessary that all the element labels are input, and some of the element labels may be missing.

In the present embodiment, the learning unit 205 performs machine learning based on the teacher data stored in the teacher data DB 51, generates an identifying model for identifying type data based on a feature amount included in a chart image, and stores the identifying model in the model DB 52. In addition, the learning unit 205 may generate a trend element identifying model for identifying a trend element based on a feature amount included in a chart image, and store the trend element identifying model in the model DB 52.

Next, processing in the image acquiring unit 201 will be described.

The image acquiring unit 201 acquires a prediction target image indicating a chart to be a prediction target of a financial instrument from the user terminal 4, and stores the prediction target image in the prediction target image DB 53 as prediction target image data. The image acquiring unit 201 stores the prediction target image data including a data type, a file name, acquisition date and time of the prediction target image, and the like, using prediction target image ID information unique to the prediction target image as a key.

The image acquiring unit 201 acquires chart information associated with the prediction target image, and stores the chart information in association with the prediction target image data. The chart information includes information indicating a target financial instrument, an information collection period, and price information. The information indicating a financial instrument is a security name or a security code in case of a stock chart, and is a currency pair or the like in case of a currency chart. The information collection period includes date and time when the chart is acquired, and time-series data such as days, hours, and months. The price information indicates a market value of a financial instrument. The image acquiring unit 201 preferably acquires, by image recognition, chart information included in the prediction target image.

In addition, the image acquiring unit 201 acquires IR-related information associated with the prediction target image, and stores the IR-related information in association with the prediction target image data. The IR-related information is acquired from a company website or the like, stored in advance in the storing unit 5, extracted according to an issue or an information collection period included in the chart information, and associated with the prediction target image data.

Next, image processing in the image processing unit 202 will be described. The image processing unit 202 executes correction processing on the prediction target image included in the prediction target image data acquired by the image acquiring unit 201, and outputs the corrected prediction target image.

The image processing unit 202 identifies a non-trend element included in the prediction target image, and executes correction processing on the prediction target image based on the identified non-trend element. The non-trend element is an element that does not affect a trend of price fluctuations, and indicates an element that becomes noise in identification of a trend element and in output processing of type data. The non-trend element includes, for example, a chart region in which a rising value or a falling value of price fluctuations is equal to or less than a predetermined value. The image processing unit 202 executes correction processing for converting a chart region identified as a non-trend element into an approximate straight line or an approximate curve. Note that the image processing unit 202 may execute correction processing for deleting the chart region identified as a non-trend element. The correction processing related to a non-trend element is not limited to the above-described processing contents as long as the correction processing is intended to reduce processing load of hardware related to the subsequent image processing. Identification of a non-trend element can be executed without using an identifying model.

The image processing unit 202 identifies a trend element included in the prediction target image using the trend element identifying model, and executes correction processing on the prediction target image based on the identified trend element. The trend element indicates an element related to a chart shape indicating a trend of price fluctuations used in technical analysis. The trend element includes at least extreme values that are top (highest price) and bottom (lowest price) in a chart illustrating price fluctuations. In addition, the trend element includes double top/double bottom, V-shape, box, pennant, wedge, triangle, and the like. Note that the trend element is not limited to the above-described examples, and includes an element that becomes a feature of a chart referred to in technical analysis. The image processing unit 202 executes correction processing for providing an auxiliary element to the prediction target image identified as a trend element. The auxiliary element includes auxiliary lines provided to a chart in technical analysis, such as a trend line (Neckline), a support line, and a resistance line. Note that the auxiliary element is not limited to the auxiliary lines as described above, and includes auxiliary elements provided to a chart image in technical analysis.

The image processing unit 202 includes correction processing data related to contents of correction processing executed on the prediction target image in association with each trend element or non-trend element. The image processing unit 202 executes correction processing on the prediction target image according to the identified trend element or the identified non-trend element, and stores the prediction target image subjected to the correction processing (image processing) in the prediction target image DB 53.

Figure 4A:
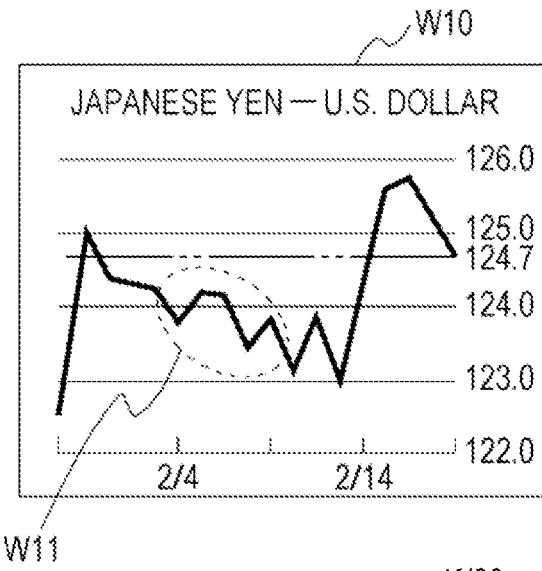
FIGS. 4A to 4C illustrate outlines of an image processing unit according to the embodiment of the present invention.
Figure 4B:
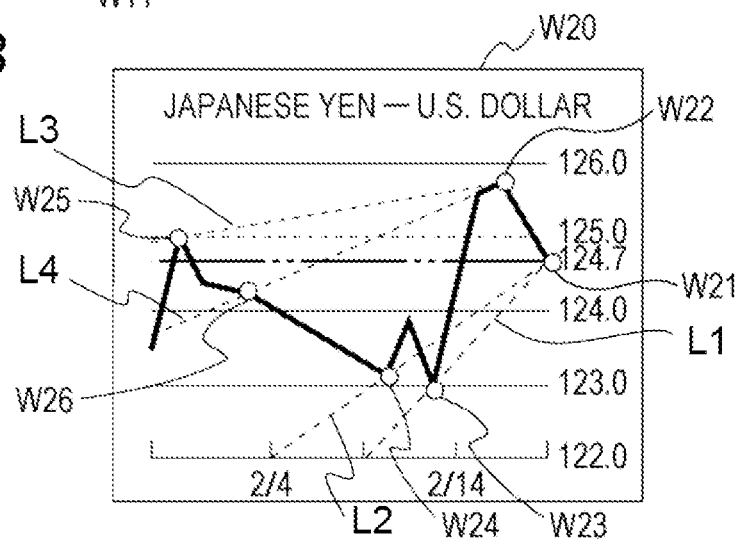
Figure 4C:
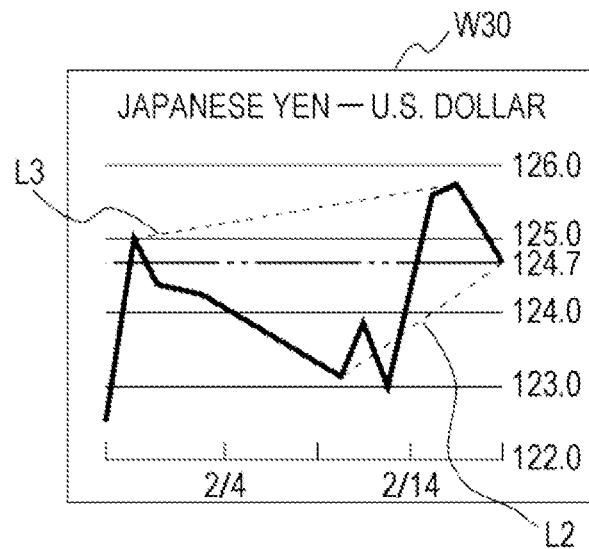

Image processing in the image processing unit 202 will be described with reference to FIGS. 4A to 4C. FIG. 4A illustrates a prediction target image W 10 before image processing is executed by the image processing unit 202. FIG. 4B illustrates a prediction target image W 20 on which correction processing related to a non-trend element has been executed. FIG. 4C illustrates a prediction target image W 30 on which correction processing related to a trend element has been executed.

The image processing unit 202 identifies a chart region W 11 indicating a non-trend element in the prediction target image W 10. The image processing unit 202 executes correction processing for converting the chart region W 11 into an approximate straight line, and acquires the prediction target image W 20. The prediction target image W 20 includes, as trend elements, a current low W 21, a current high W 22, an all-time low W 23, a semi-all-time low W 24, an all-time high W 25, and a semi-all-time high W 26, and each indicate extreme values in the chart. The image processing unit 202 executes correction processing of providing a trend line L1, a trend line L2, a trend line L3, and a trend line L4. The trend line L1 is a straight line including the current low W 21 and the all-time low W 23. The trend line L2 is a straight line including the current low W 21 and the semi-all-time low W 24. The trend line L3 is a straight line including the current high W 22 and the all-time high W 25. The trend line L4 is a straight line including the current high W 22 and the semi-all-time high W 26. The image processing unit 202 at least executes correction processing of providing a trend line having the longest length between vertices of two trend lines (L1 and L2) connecting vertices serving as extreme values of low prices. Note that the number of trend lines is not limited, and may be increased/decreased as compared with the illustrated example. Note that the image processing unit 202 also executes similar correction processing for the trend lines (L3 and L4) connecting vertices serving as extreme values of high prices. The image processing unit 202 executes correction processing of providing an auxiliary element such as a trend line, and acquires the prediction target image W 30. The prediction target image W 30 is a chart image to which at least the trend line L2 and the trend line L3 having the longest inter-vertex length are provided. By executing the correction processing as described above, features of a chart shape of a trend element included in a prediction target image become clear, and it is possible to improve identification accuracy when the prediction target image data is input to the identifying model.

Note that the learning unit 205 preferably further executes machine learning processing related to an identifying model for identifying type data based on a chart image subjected to correction processing similar to one of the image processing unit 202. The outputting unit 203 can input a prediction target image subjected to the correction processing to this identifying model and output type data with high accuracy.

The outputting unit 203 inputs prediction target image data including the prediction target image subjected to correction processing by the image processing unit 202 to the identifying model, and outputs, from the identifying model, type data serving as a type of a chart included in the prediction target image. Further, the predicting unit 204 outputs a predicted value of a future price of a financial instrument related to the prediction target image based on a future price after a lapse of a predetermined period from the type data. The predicting unit 204 stores the prediction result in the result DB 54.

FIGS. 5A and 5B illustrate examples of data structures stored in the result DB 54. FIG. 5A illustrates a data structure in which the instrument type is stock, and FIG. 5B illustrates a data structure in which the instrument type is currency, each as an example. The result DB 54 stores, as a prediction result, a file name of prediction target image data used for prediction, an instrument type of a financial instrument, type data identified using a learned model, and a predicted value of a future price predicted based on the type data, using the prediction target image ID information unique to the prediction target image as a key. Type data in the prediction result corresponds to teacher data having cumulative chart images stored in the teacher data DB. The type data may include at least the teacher data ID information of the teacher data, and may include various labels of the teacher data that can be acquired by referring to the teacher data ID information. A predicted value indicates a future price included in type data. The predicting unit 204 may acquire, based on type data, a price of a financial instrument after a lapse of a predetermined time from the type data and output the price as a predicted value of a future price. In addition, the future price preferably includes a rising value or a falling value.

The outputting unit 203 determines, based on an instrument type, an issue, a currency pair, a period, and the like included in the prediction target image data, a learned model to which the prediction target image is input. The outputting unit 203 can output a type degree of type data output based on the input prediction target image. When the type degree is equal to or less than a predetermined value, the outputting unit 203 can determine a learned model machine-learned based on teacher data of an issue in a common industry sector, as a learned model to which the prediction target image is input.

Figure 6:
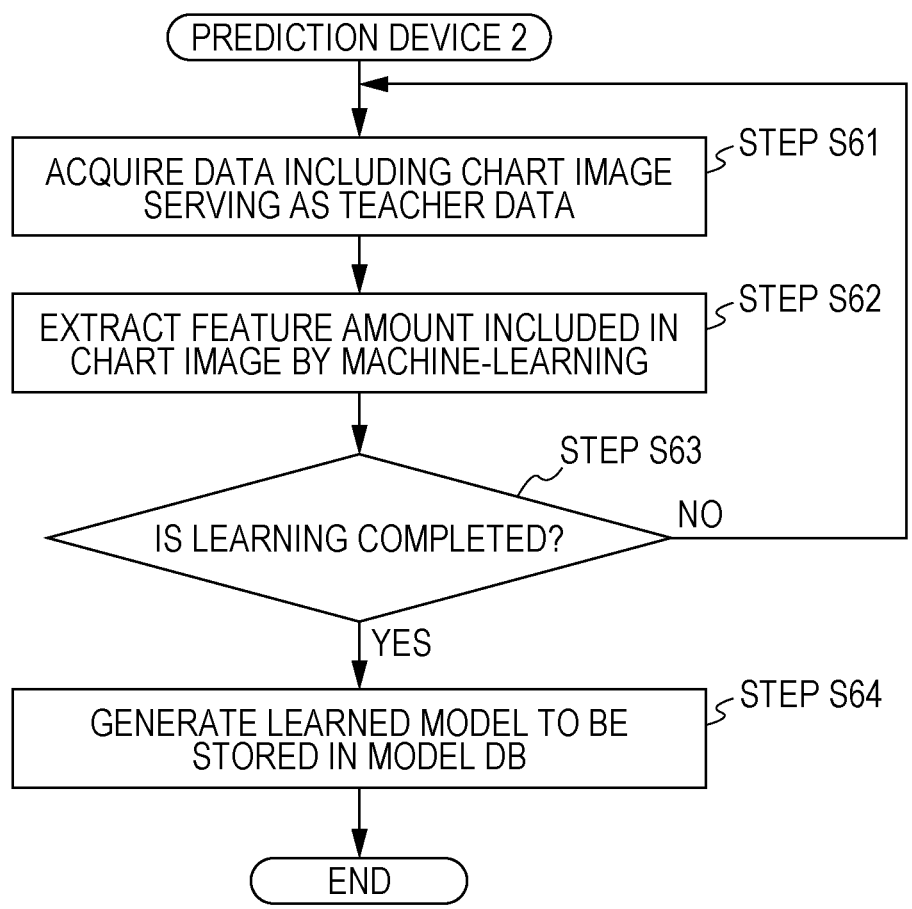
FIG. 6 illustrates a flowchart of machine learning processing according to the embodiment of the present invention.

FIG. 6 illustrates a processing flowchart of machine learning according to the present embodiment. In the present embodiment, an example in which processing related to machine learning is performed in the prediction device 2 will be described, but processing related to machine learning may be performed in an external device (not illustrated) to deliver a learned model to the prediction device 2.

First, the prediction device 2 acquires data including a chart image serving as teacher data from the financial instruments transaction system 3, the user terminal 4, or the like, assigns various element labels, and stores the data in the teacher data DB 51 (step S61). It is assumed that the teacher data includes the chart image subjected to correction processing. The learning unit 205 extracts a feature amount included in the chart image by executing machine learning processing using the teacher data to which a label is assigned (step S62). The learning unit 205 repeats the machine learning processing of steps S61 and S62 to update the feature amount (step S63). As a result, a learned model (identifying model and trend element identification model) is generated and stored in the model DB 52 (step S64).

Figure 7:
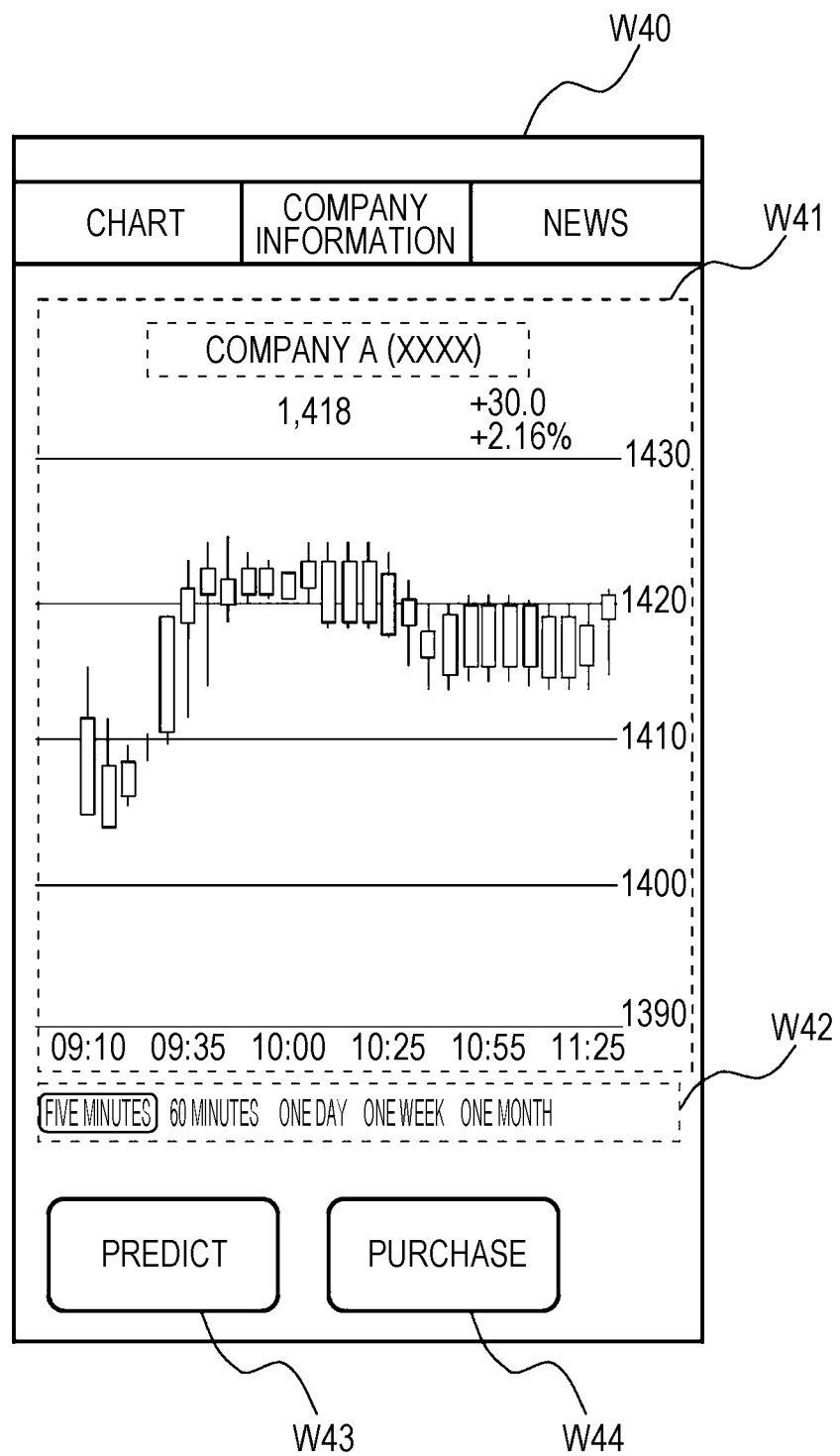
FIG. 7 illustrates an example of a screen display of a transaction screen according to the embodiment of the present invention.

Next, a flow of processing from acquisition of a prediction target image to output of a predicted value of a future price will be described with reference to FIGS. 7 and 8. FIG. 7 illustrates a screen display example of a transaction screen when acquiring a prediction target image. FIG. 8 illustrates a flowchart related to prediction processing.

In the present embodiment, the user terminal 4 accesses the prediction system 1 to display a transaction screen W 40 illustrated in FIG. 7 for acquiring a chart image serving as a prediction target image. The transaction screen W 40 includes a chart image displaying unit W 41, a period setting unit W 42, a prediction instructing unit W 43, and a transaction instructing unit W 44. The chart image displaying unit W 41 displays a chart related to price fluctuations of a financial instrument. The chart image displaying unit W 41 includes a chart image, a financial instrument to be predicted (security name, security code, currency pair, and the like), prices (vertical axis), periods (horizontal axis), and the like. The period setting unit W 42 receives a setting input of the data collection period such as minutes, hours, and months to be reflected in the period of the chart image displaying unit W 41. When pressed, the prediction instructing unit W 43 can transmit a chart image of the chart image displaying unit W 41 to the prediction device 2 as a prediction target image. When pressed, the transaction instructing unit W 44 can execute transaction processing of a financial instrument displayed on the transaction screen W 40 by the transacting unit 403. The transaction screen W 40 can display a predicted value of a future price by the prediction device 2, and for example, a user can start transaction of a financial instrument by pressing the transaction instructing unit W 44 according to a displayed predicted value.

The user terminal 4 may transmit a prediction target image from a data file to the prediction device 2. For example, the user terminal 4 can include an imaging unit as a hardware configuration and store image data captured by the imaging unit in a data file, thereby setting a prediction target image. With such a configuration, it is possible to easily acquire a prediction target image from outside of the prediction system 1.

The image acquiring unit 201 acquires a prediction target image by the method described above, and stores the prediction target image in the prediction target image DB 53 as prediction target image data (step S81). At this time, the image acquiring unit 201 can acquire information indicating a stock name or a currency pair included in the chart image display unit W 41, a period (time axis), a price, and the like by image recognition, and store the information in association with the prediction target image data.

The image processing unit 202 executes correction processing on a prediction target image in the prediction target image data stored in the prediction target image DB 53, updates the prediction target image, and stores the updated prediction target image in the prediction target image DB 53 (step S82).

The outputting unit 203 inputs the prediction target image data stored in the prediction target image DB 53 to an identifying model, thereby identifying and outputting type data (step S83). At this time, the identifying model is determined according to an issue, a period, and the like included in the prediction target image data. In addition, the outputting unit 203 can output the type degree of a prediction target image to be input and type data to be output, and can input the prediction target image to a different identifying model when the type degree is equal to or less than a predetermined value.

The predicting unit 204 outputs, based on the type data identified by the identifying model, a future price of the type data as a predicted value of a future price of a financial instrument to be predicted (step S84). In addition, the predicting unit 204 may acquire, based on type data, a price of a financial instrument after a lapse of a predetermined period from the type data, and output the price as a predicted value.

By later accepting information input regarding whether the predicted value output by the predicting unit 204 is correct or incorrect, the learning unit 205 can execute machine learning processing on the identifying model.

The predicted value output by the predicting unit 204 is displayed on the user terminal 4 and used for decision making on selection whether to transact the financial instrument. Note that the predicting unit 204 may output the prediction target image subjected to correction processing and the trend element identified by the identifying model together, to be displayed on the user terminal 4. With such a configuration, it is possible to know which feature part of a chart contributes to price fluctuations of a financial instrument, and even a user who is unfamiliar with investment can learn methods of technical analysis.

A different embodiment of the present invention will be described. In the present embodiment, the prediction system further includes a learning device 6 as a configuration. A hardware configuration of the learning device 6 is similar to one of the prediction device 2. The learning device 6 includes a learning unit 601 similar to the learning unit 205 as a functional component. The learning unit 601 executes machine learning processing using teacher data similar to the teacher data DB 51, and generates a learned model similar to the model DB 52. The learned model generated by the learning device 6 is provided to the model DB 52, so that the prediction system 1 can achieve a similar function effect.

REFERENCE SIGNS LIST 1 prediction system
2 prediction device
21 arithmetic device (CPU)
22 main storage device (RAM)
23 auxiliary storage device
24 communication device
25 communication bus
26 operating system (OS)
27 prediction program
201 image acquiring unit
202 image processing unit
203 outputting unit
204 predicting unit
205 learning unit
3 financial instruments transaction system
4 user terminal
401 inputting unit
402 outputting unit
403 transacting unit
5 storing unit
51 teacher data DB
52 model DB
53 prediction target image DB
54 result DB
6 learning device
601 learning unit

What is claimed is:
1. A prediction device that analyzes a chart image, the prediction device comprising:

a processor and a memory in communication with one another;

wherein the processor is configured to:

acquire a prediction target image from an image acquiring unit, the prediction target image being transmitted from a user terminal after being selected on a transaction screen for a prediction request, the prediction target image is image data of the chart image;

identify by image recognition a non-trend element in the prediction target image in which fluctuations in the prediction target image are equal to or less than predetermined values, and execute first correction image processing on the prediction target image by modifying a region of the prediction target image identified as the non-trend element into an approximate straight line or an approximate curve to generate a modified prediction target image, identify by image recognition a trend element in the prediction target image indicating a trend including extreme fluctuations in the prediction target image, and execute second correction image processing on the modified prediction target image to modify the modified prediction target image by providing a straight line on the modified prediction target image that includes at least two or more of the extreme fluctuations;

input the modified prediction target image to a trained machine learning model to identify another chart image having a chart shape similar to a chart shape of the prediction target image and output, from the trained machine learning model, the another chart image;

output a prediction value based on the another chart image after a lapse of a predetermined period and output the modified prediction target image and the trend element for displaying on a display; and wherein the trained machine learning model is trained by a data set including a training chart image that is subjected to the first correction image processing and the second correction image processing, and trained by a prior prediction value based on the training chart image after a lapse of a predetermined period.

2. The prediction device according to claim 1, wherein the processor is configured to determine a trained machine learning model that has been trained using another chart image with a similar chart shape as the data set but of a different name in a common industry sector as the data set, as a learned model to which the prediction target image is input.

3. A prediction system comprising:

the prediction device according to claim 1, and a terminal device;

the terminal device is in electronic communication with the prediction device, the terminal device including a processor and a memory;

wherein the processor of the terminal device is configured to transmit a prediction instruction to the prediction device for predicting the prediction value of the prediction target image displayed on a display of the terminal device;

the processor of the terminal device acquires the prediction value from the prediction device; and the processor of the terminal device displays the prediction value on the display of the terminal device.

4. A prediction method for analyzing a chart image, the prediction method executed by a computer having a processor and a memory, the method comprising:

acquiring a prediction target image from an image acquiring unit, wherein the prediction target image is image data of the chart image;

transmitting the prediction target image by selecting on a transaction screen a prediction request of the chart image displayed on the transaction screen;

the processor acquiring the transmitted prediction target image;

the processor, using image recognition, identifying a non-trend element in the prediction target image in which fluctuations in the prediction target image are equal to or less than predetermined values, and executing first correction image processing on the prediction target image by modifying a region of the prediction target image identified as the non-trend element into an approximate straight line or an approximate curve and generating a modified prediction target image, the processor identifying a trend element in the prediction target image indicating a trend including extreme fluctuations in the prediction target image, and executing second correction image processing on the modified prediction target image to modify the modified prediction target image by providing a straight line on the modified prediction target image that includes at least two or more of the extreme fluctuations;

the processor, using image recognition, inputting the modified prediction target image to a trained machine learning model to identify another chart image having a chart shape similar to a chart shape of the prediction target image and outputting, from the trained machine learning model, the another chart image;

the processor outputting a prediction value based on the another chart image after a lapse of a predetermined period and outputting the modified prediction target image and the trend element;

displaying the prediction value, the modified prediction target image, and the trend element on a display, wherein the trained machine learning model is trained by a data set including a training chart image that is subjected to the first correction image processing and the second correction image processing, and trained by a prior prediction value based on the training chart image after a lapse of a predetermined period.

5. A non-transitory computer readable medium that stores a prediction program that analyzes a chart image, the prediction program is executed by a processor of a computer that causes the processor to:

acquire a prediction target image from an image acquiring unit, the prediction target image being transmitted from a user terminal after being selected on a transaction screen for a prediction request, the prediction target image is image data of the chart image;

identify by image recognition a non-trend element in the prediction target image in which fluctuations in the prediction target image are equal to or less than predetermined values, and executes first correction image processing on the prediction target image by modifying a region of the prediction target image identified as the non-trend element into an approximate straight line or an approximate curve to generate a modified prediction target image, identify by image recognition a trend element in the prediction target image indicating a trend including extreme fluctuations in the prediction target image, and executes second correction image processing on the modified prediction target image to modify the modified prediction target image by providing a straight line on the modified prediction target image that includes at least two or more of the extreme fluctuations;
input the modified prediction target image to a trained machine learning model to identify another chart image having a chart shape similar to a chart shape of the prediction target image and output, from the trained machine learning model, the another chart image;
output a prediction value based on the another chart image after a lapse of a predetermined period and output the modified prediction target image and the trend element for displaying on a display; and
the trained machine learning model is trained by a data set including a training chart image that is subjected to the first correction image processing and the second correction image processing, and trained by a prior prediction value based on the training chart image after a lapse of a predetermined period.

\* \* \* \* \*